(12) United States Patent
Kawamura et al.

(10) Patent No.: US 6,631,914 B2
(45) Date of Patent: Oct. 14, 2003

(54) VEHICLE SUSPENSION DEVICE

(75) Inventors: Kazunori Kawamura, Hiroshima (JP); Masashi Oda, Hiroshima (JP); Hiroyoshi Kumada, Hiroshima (JP); Toshihide Koyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 27 days.

(21) Appl. No.: 09/984,979

(22) Filed: Oct. 31, 2001

(65) Prior Publication Data

US 2002/0109324 A1 Aug. 15, 2002

(30) Foreign Application Priority Data

Oct. 31, 2000 (JP) ........................................ 2000-332377

(51) Int. Cl.⁷ ............................................... B60D 21/11
(52) U.S. Cl. ....................... 280/124.107; 280/124.177; 180/381
(58) Field of Search ................... 280/124.107, 124.108, 280/124.109, 124.152, 124.177, 788; 180/377, 379, 381

(56) References Cited

U.S. PATENT DOCUMENTS

| | | | |
|---|---|---|---|
| 4,652,009 A | 3/1987 | Ando et al. | |
| 4,723,791 A | * 2/1988 | Miura et al. | ........... 280/124.109 |
| 4,826,203 A | 5/1989 | Kijima et al. | |
| 4,865,350 A | 9/1989 | Yamamoto | |
| 4,966,384 A | * 10/1990 | Endo et al. | ............ 280/124.109 |
| 4,998,748 A | * 3/1991 | Kashiwagi et al. | ....... 280/5.524 |
| 5,064,018 A | * 11/1991 | Encke | ......................... 180/360 |
| 5,267,623 A | 12/1993 | Kashiwagi | |
| 5,280,957 A | * 1/1994 | Hentschel et al. | ........... 280/788 |
| 5,385,369 A | * 1/1995 | Mukai et al. | ................ 280/788 |
| 5,511,817 A | 4/1996 | Kasahara et al. | |
| 5,611,569 A | 3/1997 | Sekiguchi et al. | |

FOREIGN PATENT DOCUMENTS

| | | |
|---|---|---|
| DE | 196 15 207 C1 | 9/1997 |
| EP | 0 802 075 | 10/1997 |
| JP | 04-238781 A | 8/1992 |
| JP | 07-315245 A | 12/1995 |

* cited by examiner

*Primary Examiner*—Paul N. Dickson
*Assistant Examiner*—David R. Dunn
(74) *Attorney, Agent, or Firm*—Nixon Peabody LLP; Donald R. Studebaker (57) ABSTRACT

A suspension system is provided with a suspension cross member 12 for rear wheels, a suspension member supported on the suspension cross member 12, elastic mounts 19 to 21 for mounting the suspension cross member 12 on the vehicle body, the elastic mounting means 19 to 21 being provided at three positions along forward and backward directions in such a manner as to form a triangle when the vehicle body is viewed sideways. Thus, a change in wheel alignment can be effectively suppressed without reducing a vehicle's comfort to ride.

8 Claims, 5 Drawing Sheets

VEHICLE SUSPENSION DEVICE

The present invention relates to a vehicle suspension device for supporting rear wheels on a vehicle body.

BACKGROUND OF THE INVENTION AND RELATED ART STATEMENT

A suspension system has been known in which a suspension cross member on which a suspension member for rear wheels and a differential (differential gear) are mounted is mounted on a vehicle body via elastic mounts (cylindrical mounts) provided at two positions at two front and rear positions of its lateral ends, and vibration and noise transmitted from the rear wheels or the differential while a vehicle is running is cut off to improve the vehicle's comfort to ride, for example, as disclosed in Japanese Unexamined Patent Publication No. HEI 7-315245.

In the case that the front and rear ends of the suspension cross member on which the suspension member is mounted are mounted on the vehicle body via the elastic mounts (as elastic mounting means) including rubber bushes as described above, no sufficient bearing strength of the suspension cross member can be ensured. Accordingly, when the vehicle is making a turn or the like, the elastic mounts are deformed by a lateral force transmitted from the rear wheels, thereby changing an alignment of the rear wheels to disadvantageously reduce running stability.

Further, in a vehicle in which a rigid frame (power plant frame) is provided to couple a power unit at the front part of a vehicle body and a differential at the rear part of the vehicle body in order to suppress a wind-up of the differential in response to a torque reaction force transmitted from rear wheels, which are drive wheels, while the vehicle is running, a suspension cross member on which the differential is mounted may be supported on the vehicle body by elastic mounts as disclosed in Japanese Unexamined Patent Publication No. HEI 4-238781. In such a case, vibration transmitted to the suspension cross member from the rear wheels is transmitted to the power unit via the differential and the rigid frame, thereby presenting a problem that additional vibration of the power unit is unavoidable.

In order to suppress transmission of the vibration of the power unit to the vehicle body and improve the running stability of the vehicle by suppressing a change in the wheel alignment, a large value has been set as a spring constant of the mounts for mounting the front and rear ends of the suspension cross member for the rear wheels on the vehicle body or the suspension cross member has been firmly mounted on the vehicle body via rigid mounts including metallic bushes. However, in such a case, vibration and noise transmitted from the rear wheels and the like to the vehicle body while the vehicle is running cannot be effectively reduced, presenting a problem of unavoidably making the vehicle uncomfortable to ride.

SUMMARY OF THE INVENTION

In view of the problems residing in the prior art, an object of the present invention is to provide an vehicle suspension device capable of effectively suppressing a change in wheel alignment when a vehicle is making a turn and the like without reducing the vehicle's comfort to ride.

The present invention is directed to a suspension system for a vehicle, comprising a suspension cross member; a suspension member for a rear wheel supported on the suspension cross member; first type elastic mounting means for mounting the suspension cross member on a vehicle body, the first type elastic mounting means being mounted at three positions along forward and backward directions of the vehicle body and forming a triangle when the vehicle body is viewed sideways; a rigid frame for coupling a power unit provided at a front part of the vehicle body to a differential provided at a rear part of the vehicle body; and second type elastic mounting means for mounting the differential on the suspension cross member, a spring constant of the second elastic mounts being set smaller than that of the first type elastic mounting means.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

Figure 1:
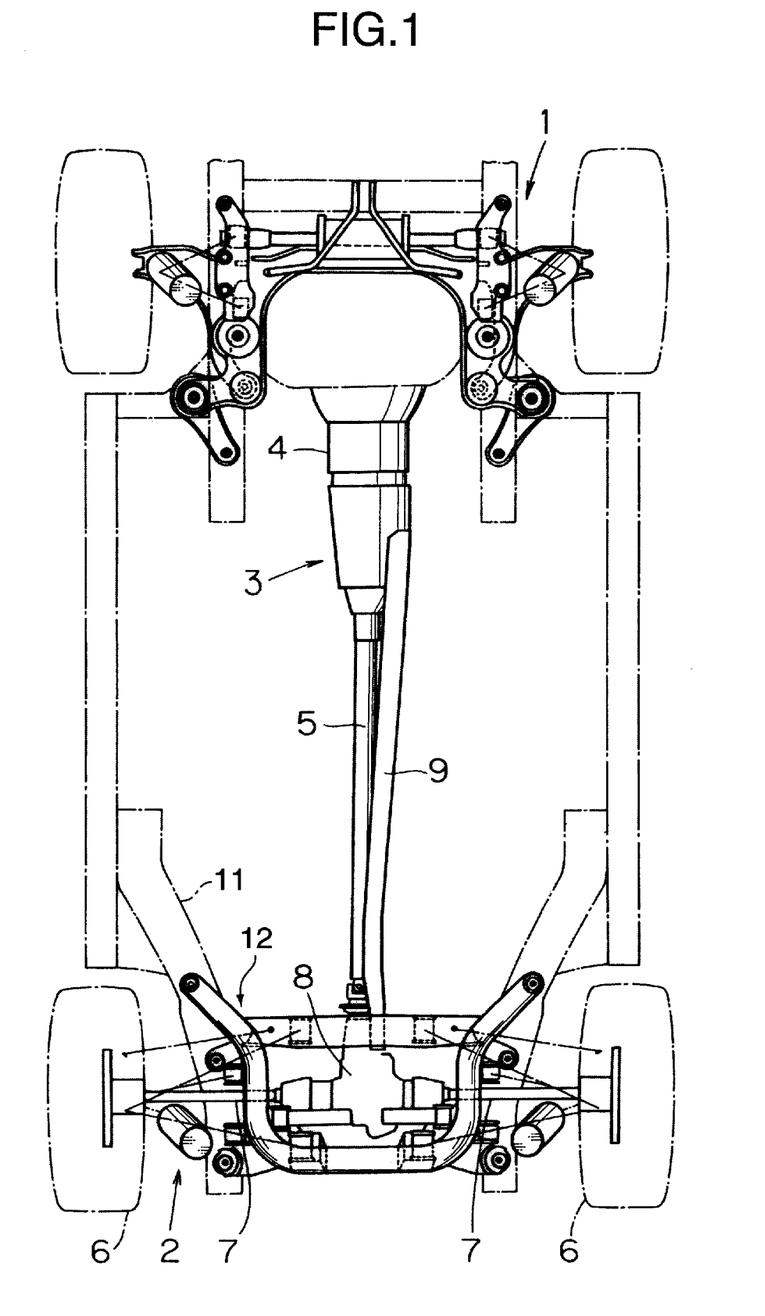
FIG. 1 is a plan view showing a chassis construction of a vehicle body.

FIG. 1 is a plan view showing a chassis construction of a vehicle body. In FIG. 1, identified by 1 is a front suspension, by 2 a rear suspension and by 3 a power train. This power training 3 includes a power unit 4 comprised of an engine and a transmission, a propeller shaft 5 driven by the power unit 4, and a differential 8 for transmitting a torque of the propeller shaft 5 to a drive shaft 7 of rear wheels 6. Further, the power unit 4 provided at the front side of the vehicle body and the differential 8 provided at the rear side thereof are coupled via a rigid frame 9 formed of a member having a U-shaped cross section, a rectangular pipe member, a round pipe member or the like.

Figure 2:
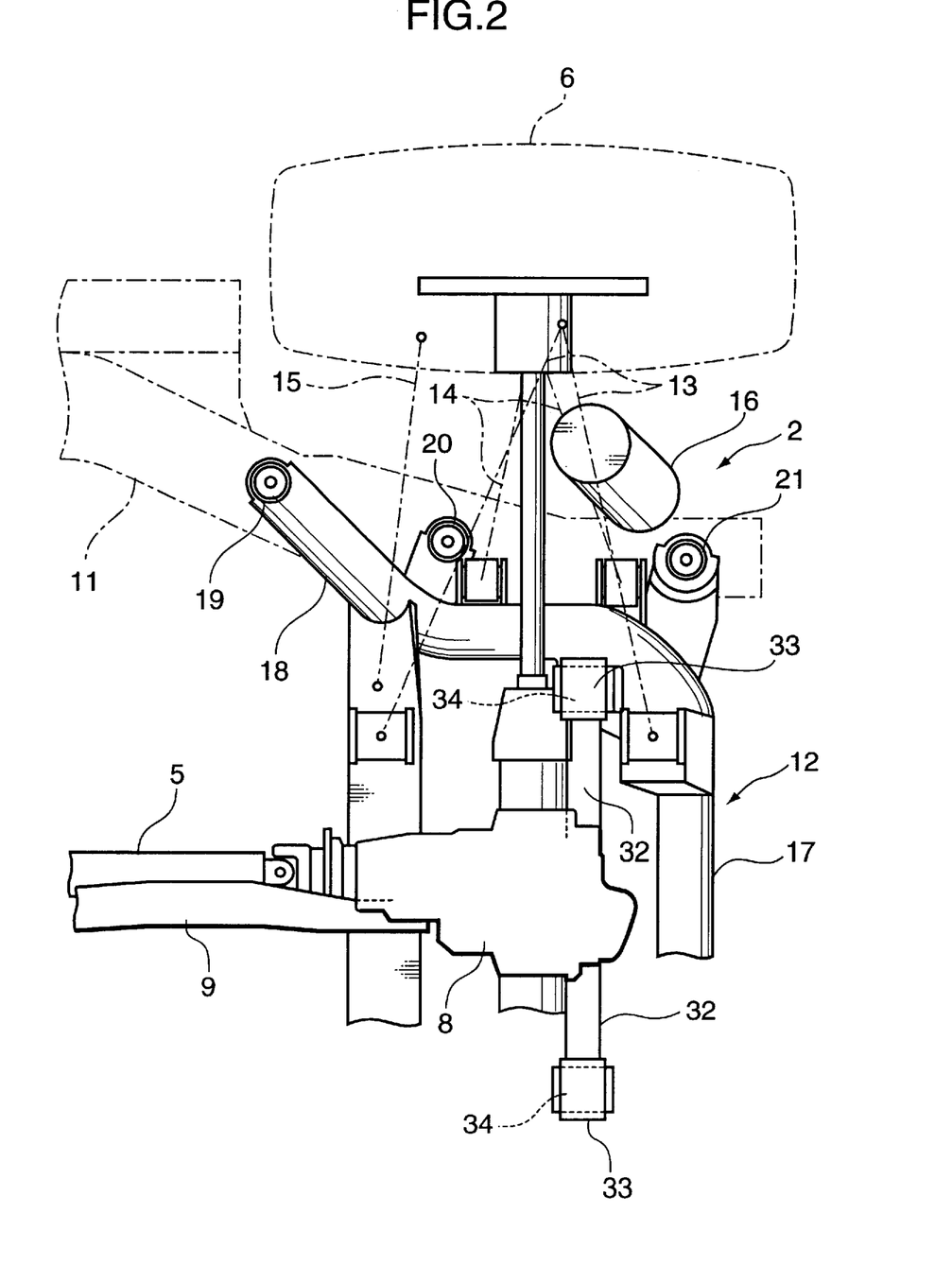
FIG. 2 is a bottom view showing one embodiment of a vehicle suspension device according to the present invention.
Figure 3:
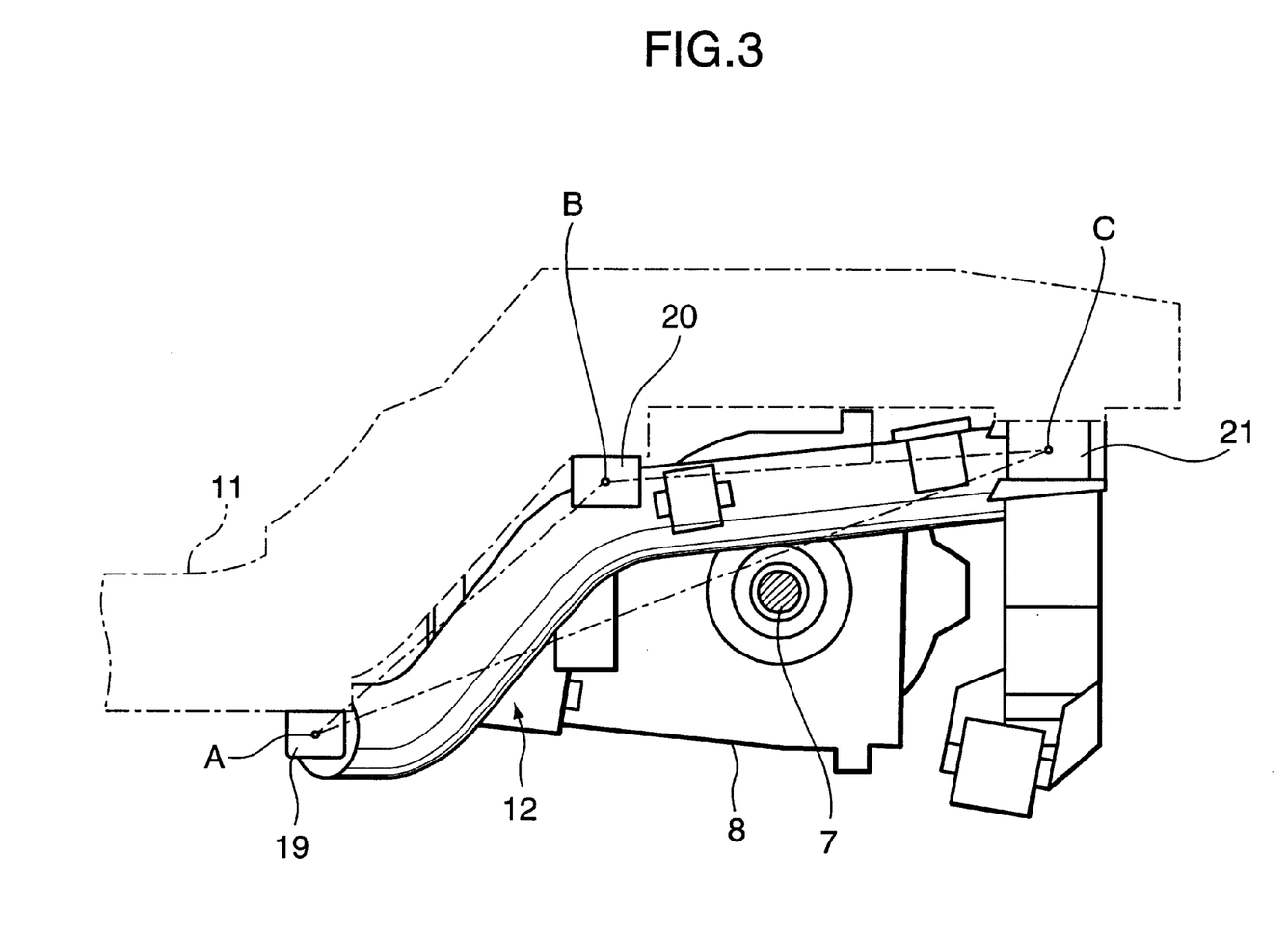
FIG. 3 is a side view showing the embodiment of the vehicle suspension device according to the present invention.

As shown in FIGS. 2 and 3, a pair of left and right rear side frames 11 extending forward of the vehicle body, and a suspension cross member 12 for the rear wheels 6 are provided at the rear side of the vehicle body. Suspension arms each comprised of lower arms 13, upper arms 14 and a toe control link 15 for supporting the rear wheels 6, and shock absorbers 16 are supported on the suspension cross member 12.

The suspension cross member 12 is comprised of a lateral beam 17 extending in the widthwise direction of the vehicle and side beams 18 extending backward of the vehicle body from the opposite ends of the lateral beam 17, so that it is U-shaped in plan view. First to third elastic mounts 19, 20, 21 for mounting the suspension cross member 12 on the corresponding rear side frame 11 are provided at three positions of each side beam 18 along the forward and backward directions of the vehicle body. The first to third elastic mounts 19 to 21 (referred also to as first type elastic mounting means) are so arranged that their mount centers A to C form a triangle when the vehicle is viewed sideways.

Figure 4:
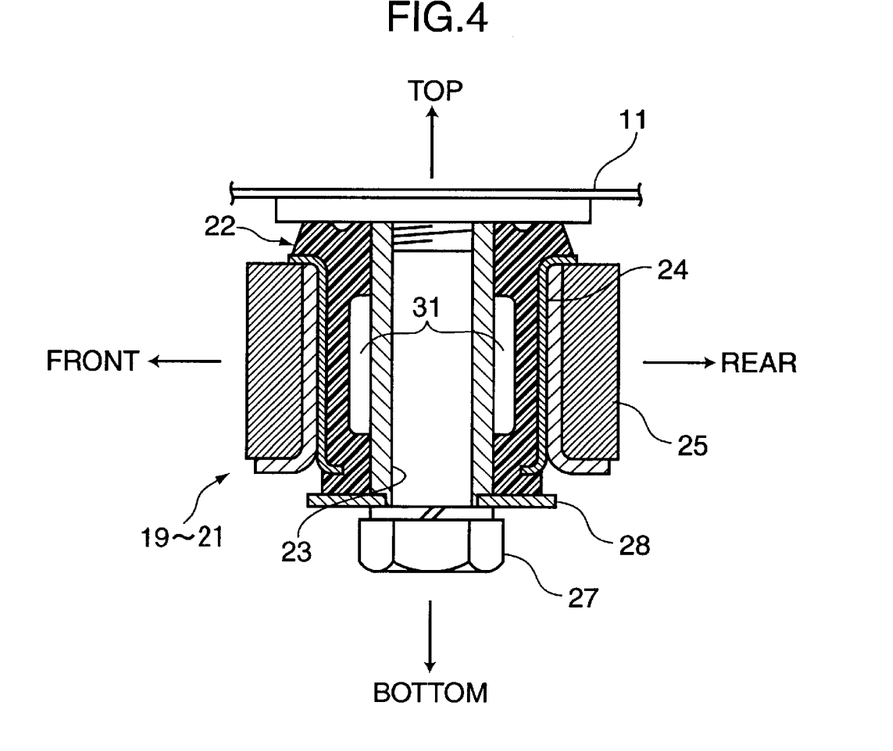
FIG. 4 is a side view in section showing a specific construction of an elastic mount for a suspension cross member.

Each of the first to third elastic mounts 19 to 21 for the suspension cross member 12 is, as shown in FIG. 4, provided with an elastic mounting element 22 formed of a cylindrical rubber bush, a spacer 23 inserted into and secured to the center of the elastic mounting element 22, and a retainer 24 fitted on the elastic mounting element 22.

The suspension cross member 12 is coupled to the rear side frames 11 by securing mount portions 25 provided in the suspension cross member 12 to the retainers 24 of the first to third elastic mounts 19 to 21 and securing the first to third elastic mounts to the lower surfaces of the rear side frames 11 by means of mounting bolts 27 and mounting plates 28.

Figure 5:
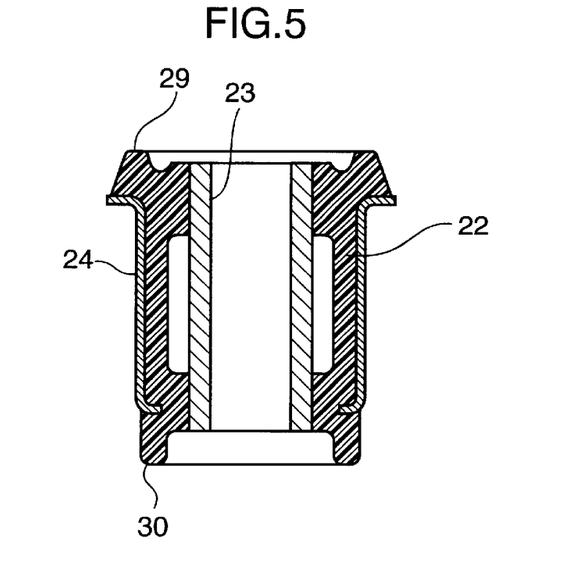
FIG. 5 is a side view in section showing a specific construction of an elastic mounting element.

At the upper and lower ends of each elastic mounting element 22, projections 29, 30 project outward from the upper and lower ends of the retainer 23 by specified amounts as shown in FIG. 5. The projections 29, 30 are pressed into contact with the rear side frames 11 and the mounting plates 28 and are vertically compressed according to fastening forces of the mounting bolts 27. Thus, the elastic mounts 19 to 21 are provided between the suspension cross member 12 and the rear side frames 11 while being compressed beforehand.

Figure 6:
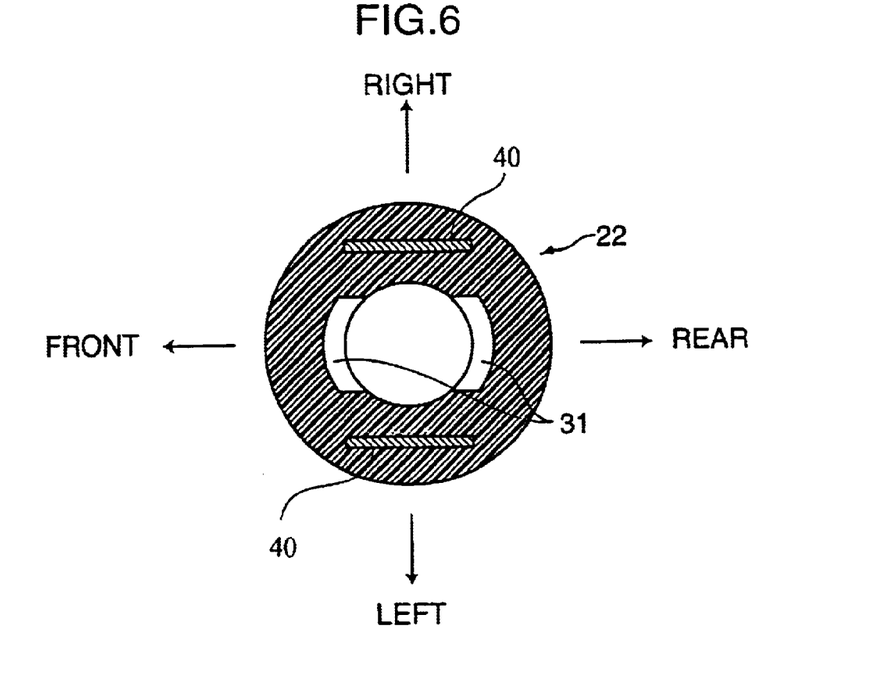
FIG. 6 is a plan view in section showing the specific construction of the elastic mounting element.

The first elastic mounts 19 located at a front position are compressed beforehand to a smaller degree than the second and third elastic mounts 20, 21 located at the middle and rear positions along the forward and backward directions of the vehicle body, so that a spring constant of the first elastic mounts 19 is smallest. Further, the elastic mounting element 22 of each elastic mount 19 to 21 is formed with front and rear clearances and has reinforcing members 40 embedded at the left and right sides as shown in FIG. 6. In this way, a spring constant in the forward and backward directions of the vehicle body is set relatively smaller than the one in the transverse direction of the vehicle body.

A pair of left and right supporting arms 32 extending in the widthwise direction of the vehicle project from the differential 8, and bosses 33 provided at the leading ends of the supporting arms 32 are mounted on the suspension cross member 12 via elastic mounts 34 (referred also as to second type elastic mounting means) as shown in FIG. 2. Each elastic mount 34 is provided with an elastic mounting element 35 formed of a cylindrical rubber bush, a spacer 36 inserted into and secured to the center of the elastic mounting element 35, and a retainer 37 fitted on the elastic mounting element 35.

The leading end of each supporting arm 32 is secured to the retainer 37 of the corresponding elastic mount 34 and secured to a pair of front and rear mounting brackets 38 provided on the suspension cross member 12 by means of mounting bolts 39 with the elastic mount 34 placed between the mounting brackets 38. In this way, the differential 8 is mounted on the suspension cross member 12 via the elastic mounts 34.

Figure 7:
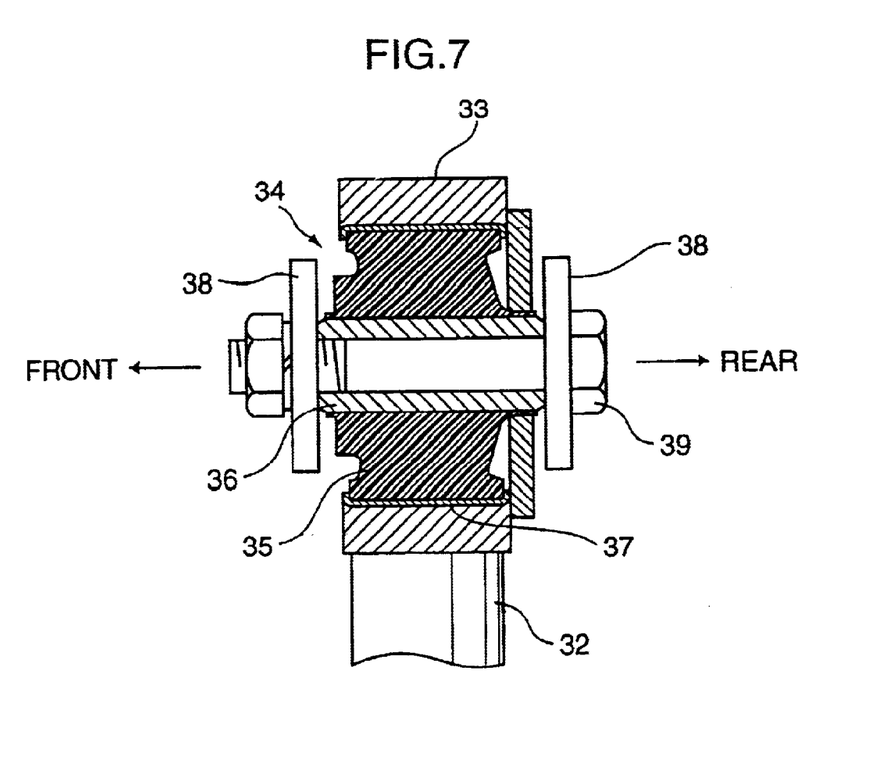
FIG. 7 is a plan view in section showing a specific construction of an elastic mount for a differential.

The elastic mounts 34 for the differential 8 are provided between the supporting arms 32 and the suspension cross member 12 without their elastic mounting elements 35 being compressed beforehand, the longitudinal axes of the spacers 36 and the retainers 37 extend in the forward and backward directions of the vehicle body, and the leading ends of the supporting arms 32 secured to the retainers 37 are easily displaceable in forward and backward directions. Thus, a spring constant of the elastic mounts 34 for the differential 8 in forward and backward directions is set smaller than that of the elastic mounts 19 to 21 for the suspension cross member 12 in forward and backward directions.

As described above, the first to third elastic mounts 19 to 21 for mounting the suspension cross member 12 on the rear side frames 11 are provided at three positions along the forward and backward directions of the vehicle body such that they form a triangle when the vehicle body is viewed sideways. Therefore, a moment acting in a direction to deform the suspension cross member 12 and a load causing the vehicle body to undergo a swivel displacement when the vehicle is making a turn can be effectively supported by the first to third mounts 19 to 21.

For example, if the suspension cross member 12 is supported on the front side frames 11 by front and rear mounts provided at two positions, the two mounts are arranged in a straight line. Thus, a moment acting in such a direction as to pivot the suspension cross member 12 about an arrangement axis of the two mounts in response to a centrifugal force acting on the vehicle body and a reaction force which accordingly acts on the rear wheels 6 when the vehicle is making a turn cannot be stably supported. Thus, the suspension cross member 12 undergoes a large pivotal displacement, making a change of the wheel alignment unavoidable.

Contrary to this, if the first to third mounts 19 to 21 are so provided as to form a triangle when the vehicle body is viewed sideways, a moment acting about an axial line connecting two of the first to third mounts 19 to 21 when the vehicle is making a turn is received by the remaining one mount. Thus, a change of the wheel alignment resulting from the pivotal displacement of the suspension cross member 12 can be effectively suppressed.

Accordingly, also in the case that vibration and noise are cut off to prevent transmission thereof to a passenger compartment by providing the elastic mounting elements 22 formed of rubber bushes or the like in the first to third elastic mounts 19 to 21 in order to improve the vehicle's comfort to ride by preventing transmission of the vibration and noise transmitted from the rear wheels to the vehicle body, a change of the wheel alignment resulting from the pivotal displacement of the suspension cross member 12 can be effectively suppressed, an excellent comfort of ordinary motorcars and running stability of sport cars can be simultaneously obtained.

Further, if the power unit 4 provided at the front side of the vehicle body and the differential 8 provided at the rear side thereof are coupled by the rigid frame 9 formed of a member having a U-shaped cross section, a rectangular pipe member, a round pipe member or the like as described above, the vibration of the power unit 4 can be suppressed and a wind-up of the differential 8 resulting from a torque reaction force transmitted from the rear wheels 6 can be effectively controlled by the rigid frame 9.

On the other hand, if the suspension cross member 12 vibrates in response to the torque reaction forces and vibration of the rear wheels 6, it is unavoidable to transmit this vibration to the power unit 4 via the rigid frame 9. However, if the suspension cross member 12 is mounted on each rear side frame 11 via the elastic mounts 19 to 21 provided at three positions along forward and backward directions to form a triangle when the vehicle body is viewed sideways, the vibration of the suspension cross member 12 resulting from the vibration transmitted from the rear wheels 6 can be effectively suppressed. This can effectively prevent the power unit 4 from being additionally vibrated.

Since the spring constant of the elastic mounts 34 for the differential 8 is set smaller than that of the elastic mounts 19 to 21 for the suspension cross member 12 in the foregoing embodiment, even if the suspension cross member 12 vibrates due to vibration transmitted from the rear wheels 6, this vibration can be cut off by the elastic mounts 34. Thus, additional vibration of the differential 8 and the power unit 4 can be more effectively prevented.

If the rigid frame 9 is formed of a member having a closed cross section such as a rectangular pipe member or a round pipe member, there is, on the one hand, an advantage of preventing generation of sounds resulting from a torsional deformation of the rigid frame 9 and there is, on the other hand, a disadvantage that torque reaction forces of the rear wheels and the like are likely to be transmitted to the power unit 4 via the rigid frame 9. If the suspension cross member 12 having the differential 8 mounted thereon is mounted on the rear side frames 11 via the elastic mounts 19 to 21 provided at three positions along forward and backward directions to form a triangle when the vehicle body is viewed sideways and the spring constant of the elastic mounts 34 for the differential 8 is set smaller than that of the elastic mounts 19 to 21 for the suspension cross member 12 in the vehicle having the rigid frame 9, a remarkable effect of effectively preventing the vibration of the power unit 4 while preventing the generation of such sounds can be obtained.

Further, if the suspension members each comprised of the lower arms 13, the upper arms 14 and the control link 15, and the shock absorber 16 are installed where the middle and rear ones 20, 21 of the first to third elastic mounts 19 to 21 at three positions along forward and backward directions are provided as in the foregoing embodiment, vibration and the like transmitted to the suspension members from the rear wheels 6 while the vehicle is making a turn or the like can be stably received by the second and third elastic mounts 20, 21 provided at the middle and rear sides of the lateral ends of the suspension cross member 12 and can be cut off at the first elastic mounts 19 closest to the passenger compartment. This presents an advantage of effectively preventing vibration from being transmitted to the passenger compartment.

Particularly, if the spring constant of the first to third elastic mounts 19 to 21 in forward and backward directions is set smaller than the one in transverse direction by providing the clearances 31 at the front and rear sides of the elastic mounting elements 22 of the third to third elastic mounts 19 to 21 for the suspension cross member 12 and providing the reinforcing members 32 at the left and right sides thereof, the spring constant of the elastic mounts 19 to 21 in transverse direction is set at a relatively large value to suppress a transverse movement of the suspension cross member 12 and ensure running stability, and the spring constant of the elastic mounts 19 to 21 in forward and backward directions is set at a relatively small value to effectively prevent the vibration of the rear wheels 6 in forward and backward directions from being transmitted to the vehicle body via the suspension cross member 12.

Further, the spring constant of the elastic mounts 34 for the differential 8 in forward and backward directions is set smaller than that of the elastic mounts 19 to 21 in forward and backward directions in the foregoing embodiment. Thus, transmission of vibration in forward and backward directions transmitted from the rear wheels 6 to the suspension cross member 12 to the differential 8 can be suppressed at the elastic mounts 34, thereby effectively preventing this vibration from being transmitted to the power unit 4 via the rigid frame 9.

Further, if, as in the foregoing embodiment, the suspension arm is formed by the lower arms 13, the upper arms 14 and the tow control link 15 which extend in the widthwise direction of the vehicle, and the spring constant of the front ones 19 of the elastic mounts 19 to 21 for the suspension cross member 12 provided at three positions along forward and backward directions of the vehicle body is set at a smallest value, vibration and the like transmitted from the rear wheels 6 to the suspension cross member 12 can be cut off at the first elastic mounts 19 closest to the passenger compartment in an vehicle constructed to ensure a sufficient space in the passenger compartment by making an installation area of the suspension arms compact with respect to the forward and backward directions of the vehicle body. Thus, the vehicle can be effectively made more comfortable to ride.

In the foregoing embodiment, the spring constant of the first elastic mounts 19 is set smallest by setting the degree of precompression of the first elastic mounts 19 located at the most forward position among the elastic mounts 19 to 21 for the suspension cross member 12. However, the spring constant of the first elastic mounts 19 may be set smaller than those of the others by, for example, differing the materials of the elastic mounting elements 22 provided in the elastic mounts 19 to 21 or changing the size of the clearances formed in the elastic mounting elements 22.

Further, instead of the foregoing embodiment in which the leading ends of the supporting arms 32 secured to the retainers 37 are made easily displaceable in the forward and backward directions of the vehicle body by disposing the spacers 36 and the retainer 37 of the elastic mounts 34 for the differential 8 such that their axes extend in the forward and backward directions, the leading ends of the supporting arms 32 may be made easily displaceable in the forward and backward directions by disposing the spacers 36 and the retainer 37 such that their axes extend in vertical direction and making the spring constant of the elastic mounting elements 35 smaller or forming clearances at the front and rear parts of the elastic mounting elements 35.

As described above, the inventive suspension system is provided with the suspension cross member for the rear wheels, the suspension members supported on the suspension cross member, the elastic mounts for mounting the suspension cross member on the vehicle body, the elastic mounts being provided at three positions along forward and backward directions in such a manner as to form a triangle when the vehicle body is viewed sideways. Thus, even in the case that transmission of vibration and noise from the rear wheels to the vehicle body while the vehicle is running is prevented by providing the elastic mounting elements in the elastic mounts to provide an excellent comfort to ride, a moment acting in a direction to deform the suspension cross member and a load to cause the vehicle body to undergo a swivel displacement while the vehicle is making a turn can be stably received by the elastic mounting means, thereby presenting an advantage of effectively suppressing a change in the wheel alignment.

In summary, the present invention is directed to a suspension system for a vehicle, comprising a suspension cross member; suspension members for rear wheels supported on the suspension cross member; first type elastic mounting means for mounting the suspension cross member on a vehicle body, the first type elastic mounting means being mounted at three positions along forward and backward directions of the vehicle body and forming a triangle when the vehicle body is viewed sideways; a rigid frame for coupling a power unit provided at a front part of the vehicle body to a differential provided at a rear part of the vehicle body; and second type elastic mounting means for mounting the differential on the suspension cross member, a spring constant of the second elastic mounts being set smaller than that of the first type elastic mounting means.

With this construction, a moment acting in a direction to cause the suspension cross member to undergo a pivotal displacement and a load, etc. for causing the vehicle body to undergo a swivel displacement while the vehicle is making a turn are stably received by the first type elastic mounting means which are so disposed at three positions as to form a triangle when the vehicle body is viewed sideways. Further, vibration transmitted from the rear wheels is cut off at the first type elastic mounting means, thereby effecting preventing the vehicle from becoming less comfortable to ride by the vibration transmitted to the vehicle body.

Further, vibration and the like transmitted from the rear wheels to the suspension cross member while the vehicle is running are cut off at the second type elastic mounting means for the differential. This can effectively prevent the power unit from being additionally vibrated.

Preferably, the suspension member is provided at a position where the middle and rear ones of the first elastic mounts mounted at three positions along the forward and backward directions are installed.

With this construction, a reaction force transmitted from the rear wheels to the suspension members while the vehicle is making a turn is effectively received at the elastic mounting means disposed at the middle and rear sides of lateral ends of the suspension cross member.

Preferably, a spring constant of the first type elastic mounting means in forward and backward directions is set smaller than that of the first type elastic mounting means in transverse direction, and a spring constant of the second type elastic mounting means in forward and backward directions is set smaller than that of the first type elastic mounting means in forward and backward directions.

With this construction, a transverse movement of the suspension cross member is suppressed to ensure running stability by setting the spring constant of the elastic mounts for the suspension cross member in transverse direction at a relatively large value, whereas transmission of the vibration of the rear wheels in forward and backward directions from the suspension cross member to the vehicle body is suppressed by setting the spring constant of the elastic mounting means for the suspension cross member in forward and backward directions at a relatively small value. Further, transmission of the vibration of the suspension cross member in forward and backward directions to the differential is effectively suppressed by setting the spring constant of the elastic mounting means for the differential in forward and backward directions smaller than that of the elastic mounting means for the suspension cross member in forward and backward directions.

Preferably, there is further provided a suspension arm including a lower arm, an upper arm and a toe control link extending in the widthwise direction of the vehicle, and the spring constant of the front ones of the first type elastic mounting means disposed at three positions along the forward and backward directions of the vehicle body is set at a smallest value.

With this construction, in a vehicle in which an insulation area of the suspension members along the forward and backward directions of the vehicle body is made compact by forming the suspension arm by the respective arm members extending in the widthwise direction of the vehicle, vibration and the like of the rear wheels are cut off by the front elastic mounts by setting the spring constant of the elastic mounting means located most forward in the vehicle body. Therefore, transmission of the vibration and the like of the rear wheels to the passenger compartment is effectively prevented to make the vehicle comfortable to ride.

This application is based on Japanese patent application serial no. 2000-332377 filed in Japanese Patent Office on Oct. 31, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A suspension system for a vehicle comprising:

a suspension cross member;

a suspension member for a rear wheel supported on the suspension cross member;

first type elastic mounting means for mounting the suspension cross member on a vehicle body, the first type elastic mounting means being mounted at three positions along forward and backward directions of the vehicle body and forming a triangle when the vehicle body is viewed sideways;

a rigid frame for coupling a power unit provided at a front part of the vehicle body to a differential provided at a rear part of the vehicle body; and second type elastic mounting means for mounting the differential on the suspension cross member, a spring constant of the second elastic mounting means being set smaller than that of the first type elastic mounting means.

2. A suspension system according to claim 1, wherein the first elastic mounting means is mounted at three positions along the forward and backward directions of the vehicle and the suspension member is provided at a position where a middle one and a rear one of the first elastic mounting means are installed.

3. A suspension system according to claim 2, wherein a spring constant of the first type elastic mounting means in forward and backward directions is set smaller than that of the first type elastic mounting means in transverse direction, and a spring constant of the second type elastic mounting means in forward and backward directions is set smaller than that of the first type elastic mounting means in forward and backward directions.

4. A suspension system according to claim 1, further comprising a suspension arm including a lower arm, an upper arm and a toe control link extending in the widthwise direction of the vehicle, wherein the spring constant of a front one of the first type elastic mounting means disposed at three positions along the forward and backward directions of the vehicle body is set at a smallest value.

5. A suspension system for a vehicle comprising:

a suspension cross member;

a suspension member for a rear wheel supported on the suspension cross member;

a first elastic mount for mounting the suspension cross member on a vehicle body, the first elastic mount being mounted at three positions along forward and backward directions of the vehicle body and forming a triangle when the vehicle body is viewed sideways;

a rigid frame for coupling a power unit provided at a front part of the vehicle body to a differential provided at a rear part of the vehicle body; and a second elastic mount for mounting the differential on the suspension cross member, a spring constant of the second elastic mount being set smaller than that of the first elastic mount.

6. A suspension system according to claim 5, wherein the first elastic mount is mounted at three positions along the forward and backward directions of the vehicle and the suspension member is provided at a position where a middle one and a rear one of the first elastic mount are installed.

7. A suspension system according to claim 6, wherein a spring constant of the first elastic mount in forward and backward directions is set smaller than that of the first elastic mount in transverse direction, and a spring constant of the second elastic mount in forward and backward directions is set smaller than that of the first elastic mount in forward and backward directions.

8. A suspension system according to claim 5, further comprising a suspension arm including a lower arm, an upper arm and a toe control link extending in the widthwise direction of the vehicle, wherein the spring constant of a front one of the first elastic mount disposed at three positions along the forward and backward directions of the vehicle body is set at a smallest value.

* * * * *